(12) United States Patent
Blizzard

(10) Patent No.: US 10,717,822 B2
(45) Date of Patent: Jul. 21, 2020

(54) COMPOSITIONS HAVING ADHESION PROPERTIES

(71) Applicant: John D. Blizzard, Bay City, MI (US)

(72) Inventor: John D. Blizzard, Bay City, MI (US)

( * ) Notice: Subject to any disclaimer, the term of this patent is extended or adjusted under 35 U.S.C. 154(b) by 256 days.

(21) Appl. No.: 15/131,077

(22) Filed: Apr. 18, 2016

(65) Prior Publication Data

US 2017/0298254 A1    Oct. 19, 2017

(51) Int. Cl.
| | | |
|---|---|---|
| *C08G 77/20* | (2006.01) | |
| *C09J 183/10* | (2006.01) | |
| *C09J 4/06* | (2006.01) | |
| *C09D 183/10* | (2006.01) | |
| *C08G 77/14* | (2006.01) | |
| *C08G 77/04* | (2006.01) | |
| *B32B 37/12* | (2006.01) | |
| *C08G 77/442* | (2006.01) | |
| *C08L 101/00* | (2006.01) | |

(52) U.S. Cl.
CPC ........... *C08G 77/20* (2013.01); *C08G 77/045* (2013.01); *C08G 77/14* (2013.01); *C09D 183/10* (2013.01); *C09J 4/06* (2013.01); *C09J 183/10* (2013.01); *B32B 37/12* (2013.01); *C08G 77/442* (2013.01); *C08L 101/00* (2013.01); *C08L 2201/10* (2013.01)

(58) Field of Classification Search
CPC ....... C08G 77/02; C08G 77/045; C08G 77/08
See application file for complete search history.

(56) References Cited

U.S. PATENT DOCUMENTS

| | | | | |
|---|---|---|---|---|
| 4,746,366 A | * | 5/1988 | Philipp | C08G 77/58 106/287.19 |
| 5,902,847 A | * | 5/1999 | Yanagi | C09D 201/00 524/269 |
| 8,394,972 B2 | * | 3/2013 | Wassmer | C08G 77/14 549/215 |
| 9,567,468 B1 | * | 2/2017 | Liu | C09D 5/00 |
| 2001/0036554 A1 | * | 11/2001 | Jin | B32B 27/08 428/412 |

\* cited by examiner

*Primary Examiner* — Marc S Zimmer

(74) *Attorney, Agent, or Firm* — Marshall & Melhorn, LLC

(57) ABSTRACT

Compositions of matter that have adhesion properties. The presence of a large number of silanols on the molecules described herein creates a solubility or dispersability of these molecules in aqueous solutions that is not obtainable from random hydrolysis of the precursor silanes.

20 Claims, No Drawings

COMPOSITIONS HAVING ADHESION PROPERTIES

BACKGROUND OF THE INVENTION

This invention deals with compositions of matter that have adhesion properties. The inventors herein are not aware of any like molecules in the prior art.

THE INVENTION

Thus, what is disclosed and claimed herein is a composition of matter having the average formula:

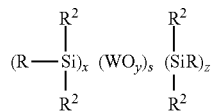

wherein the average molar ratio of x:y:z is 0.25-3:4:0.25-3, wherein W is independently selected from the group consisting essentially of Si, Ti, and Zr, and Al, wherein R is a cure functionality based on the chemistry selected from the group consisting of glycidoxy, amino, acrylamide, methacrylamide, acrylate, methacrylate, C2-C, alkenyl, mercapto, ester, isocyanato, epoxycyclohexyl, carboxylic acid, and

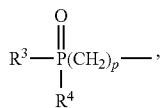

wherein p has a value of from 1 to 6 and $R^3$ and $R^4$ are independently selected from the group consisting of alkyl radicals, hydroxyl radicals and alkoxy groups having 1 to 4 carbon atoms. Each $R^2$ is independently selected from a hydroxyl group, an alkoxy group, or a

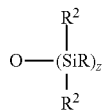

radical, wherein s has a value of about 1 to 5, and y has a value of 4. $(WO_y)$ is derived from $W(OR^7)_4$ wherein $(OR^7)$ is independently selected from the group consisting of $—OCH_3$, $—OCH_2CH_3$, $—OCH(CH_3)_2$, $—O(CH_2)_3CH_3$, $—OCH_2CH(CH_3)_2$, $—O(2\text{-ethylhexyl})$, acetoxy, and, oximo.

Additionally, what is disclosed and claimed herein is a composition of matter having the average general formula:

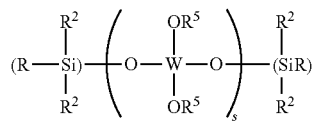

wherein $R^5$ is a hydrogen atom or $SiR^2{}_2R$, wherein W is independently selected from the group consisting essentially of Si, Ti, and Zr, and Al, wherein R is a cure functionality based on the chemistry selected from the group consisting of glycidoxy, amino, acrylamide, methacrylamide, acrylate, methacrylate, $C_2$-$C_8$ alkenyl, mercapto, ester, isocyanato, epoxycyclohexyl, carboxylic acid, and

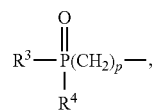

wherein p has a value of from 1 to 6, wherein $R^3$ and $R^4$ are independently selected from the group consisting of alkyl radicals, hydroxyl radicals and alkoxy groups having 1 to 4 carbon atoms, wherein each $R^2$ is independently selected from a hydroxyl group or an alkoxy group, wherein s has a value of about 1 to 5, and at least one ionomer.

DETAILED DESCRIPTION OF THE INVENTION

The compositions of this invention are low molecular weight polysilicate compositions that have high silanol or alkoxy contents, that is, have a large number of silanols or alkoxy groups in the molecule. By "large number of silanols or alkoxy groups" it is meant that at least half of the Si atoms in the molecule are bonded by hydroxy groups when fully hydrolyzed. They also contain active functional groups.

In accordance with an embodiment of the disclosure and as a non-limiting example, the present disclosure relates to a composition of matter and method of providing a composition of matter having the average general formula:

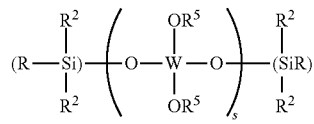

wherein $R^5$ is a hydrogen atom or $SiR^2{}_2R$, wherein W is independently selected from the group consisting essentially of Si, Ti, and Zr, and Al, wherein R is a cure functionality based on the chemistry selected from the group consisting of glycidoxy, amino, acrylamide, methacrylamide, acrylate, methacrylate, $C_2$-$C_8$ alkenyl, mercapto, ester, isocyanato, epoxycyclohexyl, carboxylic acid, and

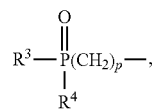

wherein p has a value of from 1 to 6, wherein $R^3$ and $R^4$ are independently selected from the group consisting of alkyl radicals, hydroxyl radicals and alkoxy groups having 1 to 4 carbon atoms, wherein each $R^2$ is independently selected from a hydroxyl group or an alkoxy group, wherein s has a value of about 1 to 5, and at least one ionomer.

One method for providing the materials of this invention comprises providing the components:

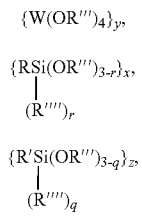

a  $\{W(OR''')_4\}_y$, b  $\{RSi(OR''')_{3-r}\}_x$,
   $|$
   $(R'''')_r$ c  $\{R'Si(OR''')_{3-q}\}_z$,
   $|$
   $(R'''')_q$ wherein the molar ratio of x:y:z is 0.25-3:4:0.25-3, wherein r and q each independently have a value of 2 or less, wherein R"" is independently selected from the methyl group or the phenyl group, and co-hydrolyzing the components in the presence of a stoichiometric amount of water, and a catalyst for hydrolysis and condensation. The components $\{W(OR''')_4\}_y$,

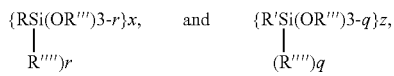

$\{RSi(OR''')3-r\}x$,  and  $\{R'Si(OR''')3-q\}z$,
$|$                         $|$
$R''''r$                    $(R'''')q$ are commercially available from several sources.

By careful, controlled hydrolysis of the precursor monomers, one can obtain these materials at very low molecular weights providing a large number of silanols, the detail of which can be found infra in the specification, and in the examples. By "large number of silanols" it is meant that at least half of the Si atoms in the molecule are bonded by hydroxy groups.

The materials have the average general formula:

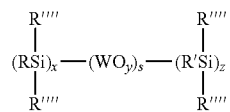

$\quad R''''\qquad\qquad R''''$
$\quad |\qquad\qquad\quad |$
$(RSi)_x-(WO_y)_s-(R'Si)_z$
$\quad |\qquad\qquad\quad |$
$\quad R''''\qquad\qquad R''''$ which is derived by the hydrolysis of the silane precursors

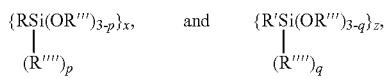

$\{RSi(OR''')_{3-p}\}_x$,  and  $\{R'Si(OR''')_{3-q}\}_z$,
$|$                              $|$
$(R'''')_p$                      $(R'''')_q$ in conjunction with the orthosilicate, or orthotitanate, orthozirconate, or orthoaluminate having the general formula $\{W(OR''')_4\}_y$, wherein the molar ratio of x:y:z is 0.25-3:4:0.25-3. This hydrolysis is carried out using a stoichiometric or near stoichiometric amounts of water and a catalyst for hydrolysis and condensation. Stoichiometric amounts of water, or, an amount of water greater than stoichiometric, results in low molecular weight materials, which is one of the objectives of the method in this invention. Caution should be noted for the use of substantially lesser amounts of water as that will result in a residual amount of alkoxy in the material, which is undesirable for purposes of this invention.

It is believed by the inventors herein that the key to this invention is the use of the molecule $\{W(OR''')_4\}_4$ as the third component of this invention. W in the case of this invention is independently selected from the group consisting of Si, Ti, Zr and Al. Preferred for this invention is Si and Ti and most preferred is Si.

The (OR') group is selected from the group consisting of —$OCH_3$, —$OCH_2CH_3$, —$OCH(CH_3)_2$, —$O(CH_2)_2CH_3$, —$OCH_2CH(CH_3)_2$, —$O(2\text{-ethylhexyl})$, acetoxy, and, oximo. Preferred for this invention are the groups —$OCH_3$, —$OCH_2CH_3$, and —$OCH(CH_3)_2$, and most preferred are the $OCH_3$ and $OCH_2CH_3$ groups. Preferred orthosilicates and oxthotitanates for this invention are $Si(OCH_2CH_3)_4$ and $Ti(-OCH(CH_3)_2)_4$.

Stoichiometry is based on the number of hydrolysable groups on the combined components. The reaction is carried out in the presence of base or acid, with acid being the preferred catalyst. The acid catalysts are preferred to be HCl, phosphoric, and acetic acids, with HCl and acetic acids being most preferred.

Bases that are useable herein are amines, NaOH, KOH and the like and preferred for this invention is NaOH. The hydrolysis reaction is carried out by combining the components in a predetermined ratio and then adding acidic or basic water to the components at a controlled rate to form silanols from the alkoxy moieties. For some end use applications of the inventive materials, a slightly higher molecular weight (higher number of silanol reactive groups) is preferred, and in this case, the silicate component is treated for a short period of time by acidic or basic wafer to cause the silicate component to hydrolyze and condense before the other components are added.

By the preferred means, the following reaction sequence is achieved using a limited amount of water for hydrolysis:

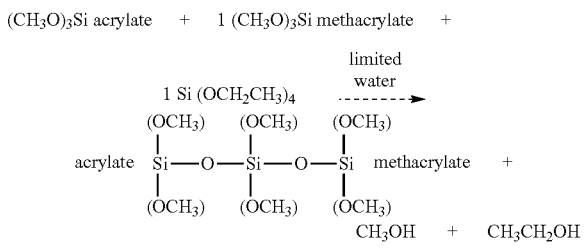

Subsequent predetermined additions of water would then result in materials having a portion of alkoxy groups and a portion of hydroxy groups on silicon, or if enough water is used, all of the alkoxy groups would hydrolyze and leave only hydroxy groups on silicon. For example,

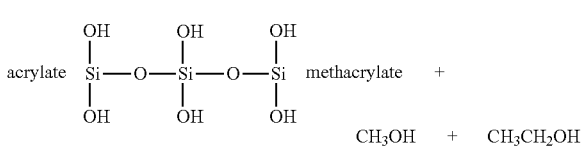

No heat is used in this reaction as higher temperatures (in excess of about 150° C.) may result in a gelation of the reaction mixture. There is a small exotherm from the hydrolysis reaction but the heat is not sufficient to provide problems with the resultant product. No solvents are required in this reaction, but it is within the scope of this invention to utilize solvents. It should be noted that the byproduct of the hydrolysis reaction is alcohol, acetic acid, or oxime. Typically, the products of this reaction do not need filtration.

As mention Supra, it is possible to enhance the molecular weight and thereby increase the amount of silanol functionality on the molecule by first mildly hydrolyzing the ortho precursor and then adding the remainder of the components.

Thus, a molecule having the following average formula may be obtained:

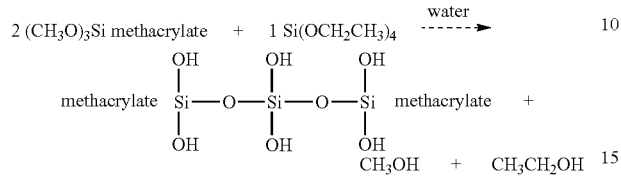

One can also provide a material having the formula:

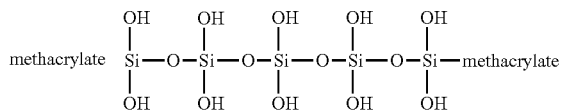

by hydrolyzing the components 2 $(CH_3O)_3Si$ methacrylate and 3 $Si(OCH_2CH_3)_4$.

A preferred material is:

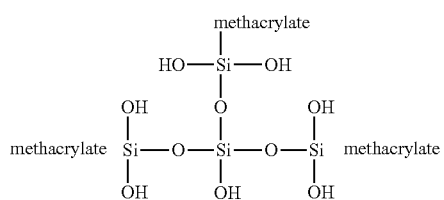

The materials are liquids as prepared. In some cases, if preferred, the by-produced alcohols, acetic acid or oxime, and any residual water can be removed to provide a solid material, and in some cases the solid material is hard and appears to be almost crystalline and in some cases, the material is waxy or paste-like.

The materials of this invention are also suitable for providing adhesion in combination with ionomers, especially glass ionomers.

Examples

The tetraethylorthosilicate or tetrabutyltitanate were placed in a 40 ml vial with a magnetic stirring bar. The functional trialkoxy-silane was added and allowed to mix for 30 minutes. Water, adjusted with KOH to pH 10 or HCl to pH 2, was added dropwise with agitation. This was allowed to hydrolyze for 60 minutes and 24 hours after which the solution was evaluated for appearance. All weights are in grams. Compound molecular weights were used to calculate the moles and molar ratios of each component. "Application" refers to the potential use of each formulated compound based on the functional group on the alkoxysilane. TABLE I shows the examples.

TABLE I

|  | MW | Sample # 1 | 2 | 3 | 4 | 5 |
|---|---|---|---|---|---|---|
| TEOS | 208 | 2.08 | 2.08 | 2.08 |  | 2.08 |
| TBT | 340 |  |  |  | 10.2 |  |
| MAPTMS | 248 | 9.92 | 7.44 | 9.92 | 22.32 | 2.48 |
| EPOXY* | 198 |  |  |  |  | 1.98 |
| MTM** |  |  |  |  |  | 1.36 |
| PrTMS*** |  |  |  |  |  | 1.64 |
| MOLES-TEOS/M |  | 1.0/4.0 | 1.0/3.0 | 1.0/4.0 | 1.0/3.0 | 1.0/4.0 |
| Water pH = 2 |  | 1.88 | 1.88 | 1.88 | 1.88 | 1.08 |
| Moles water |  | 10 | 10 |  |  | 2.88 |
| Solution [1] |  | clear UV coat. adhesion toughness | clear UV coat. adhesion toughness | clear UV coat. adhesion toughness | clear | 2 phase |

*gamma-glycidoxypropyltrimethoxysilane
**Methyltrimethoxysliane
***Propyltrimethoxysilane
[1] = application = glass slide, room temperature cure

What is claimed is:

1. A composition of matter having the average general formula:

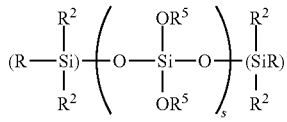

wherein $R^5$ is a hydrogen atom or $SiR^2_2R$;
wherein R is a cure functionality based on the chemistry selected from the group consisting of glycidoxy, amino, acrylamide, methacrylamide, acrylate, methacrylate, $C_2$-$C_8$ alkenyl, mercapto, ester, isocyanato, epoxycyclohexyl, carboxylic acid, and

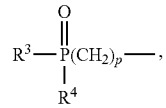

wherein p has a value of from 1 to 6;
wherein $R^3$ and $R^4$ are independently selected from the group consisting of alkyl radicals, hydroxyl radicals and alkoxy groups having 1 to 4 carbon atoms;
wherein each $R^2$ is independently selected from a hydroxyl group or an alkoxy group;
wherein s has a value of about 1 to 5; and
at least one ionomer.

2. The composition of matter of claim 1, wherein said composition of matter is a water solution.

3. The composition of matter of claim 1, wherein said composition of matter is a water-alcohol solution.

4. The composition of matter of claim 1, wherein said composition of matter is an alcohol solution.

5. A composition of matter having the average formula

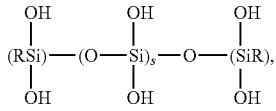

wherein R is a cure functionality based on the chemistry selected from the group consisting of amino, acrylamide, methacrylamide, acrylate, methacrylate, $C_2$-$C_8$ alkenyl, mercapto, ester, isocyanato, carboxylic acid, and

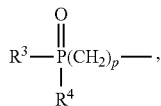

wherein s has an average value of from 1 to 5.

6. A composition of matter having the average formula

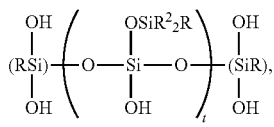

wherein R is a cure functionality based on the chemistry selected from the group consisting of amino, acrylamide, methacrylamide, acrylate, methacrylate, $C_2$-$C_8$ alkenyl, mercapto, ester, isocyanato, carboxylic acid, and

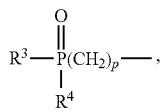

wherein t has an average value of from 1 to 5.

7. A composition of matter having the average formula

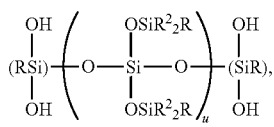

wherein R is a cure functionality based on the chemistry selected from the group consisting of amino, acrylamide, methacrylamide, acrylate, methacrylate, $C_2$-$C_8$ alkenyl, mercapto, ester, isocyanato, carboxylic acid, and

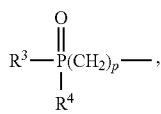

wherein u has an average value of from 1 to 5.

8. A cured composition obtained by curing the composition of claim 1.

9. A method of adhering two substrates together, the method comprising:

I. applying a composition of claim 1 to at least one of said substrates and pressing said substrates together and, thereafter, II. curing said composition.

10. The composition of matter of claim 1, wherein said composition has adhesion properties.

11. A composition of matter having the average general formula:

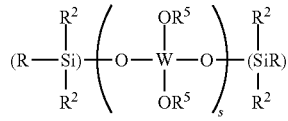

wherein $R^5$ is a hydrogen atom or $SiR^2{}_2R$;

wherein W is independently selected from the group consisting essentially of Si, Ti, and Zr, and Al;

wherein R is a cure functionality based on the chemistry selected from the group consisting of glycidoxy, amino, acrylamide, methacrylamide, acrylate, methacrylate, $C_2$-$C_8$ alkenyl, mercapto, ester, isocyanato, epoxycyclohexyl, carboxylic acid, and

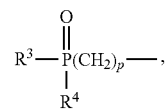

wherein p has a value of from 1 to 6;

wherein $R^3$ and $R^4$ are independently selected from the group consisting of alkyl radicals, hydroxyl radicals and alkoxy groups having 1 to 4 carbon atoms;

wherein each $R^2$ is independently selected from a hydroxyl group or an alkoxy group;

wherein s has a value of about 1 to 5; and at least one ionomer.

12. The composition of matter of claim 11, wherein said composition has adhesion properties.

13. The composition of claim 11, wherein said composition of matter is a water solution, a water-alcohol solution, or an alcohol solution.

14. A cured composition obtained by curing the composition of claim 11.

15. The composition of claim 5, wherein said composition has adhesion properties.

16. The composition of claim 5, wherein said composition of matter is a water solution, a water-alcohol solution, or an alcohol solution.

17. The composition of claim 6, wherein said composition has adhesion properties.

18. The composition of claim 6, wherein said composition of matter is a water solution, a water-alcohol solution, or an alcohol solution.

19. The composition of claim 7, wherein said composition has adhesion properties.

20. The composition of claim 7, wherein said composition of matter is a water solution, a water-alcohol solution, or an alcohol solution.

\* \* \* \* \*

UNITED STATES PATENT AND TRADEMARK OFFICE
CERTIFICATE OF CORRECTION

PATENT NO. : 10,717,822 B2
APPLICATION NO. : 15/131077
DATED : July 21, 2020
INVENTOR(S) : John D. Blizzard Page 1 of 1

It is certified that error appears in the above-identified patent and that said Letters Patent is hereby corrected as shown below:

In the Specification

Column 3: The letters "a", "b", and "c" next to and between Lines numbers "5" and "10" and should be located to the left of the relevant components of the material.

Column 6: Within TABLE I, the "1.08" in Column 5 of the "Water" row should be removed and replaced with "1.88".

Signed and Sealed this
Twenty-second Day of September, 2020

Andrei Iancu
*Director of the United States Patent and Trademark Office*